United States Patent
Zou et al.

(10) Patent No.: US 6,726,756 B1
(45) Date of Patent: Apr. 27, 2004

(54) CONTINUOUS INK JET PRINTING INK COMPOSITION

(75) Inventors: Wan Kang Zou, Lake Bluff, IL (US); Linfang Zhu, Naperville, IL (US); Xuedong Zhan, Wilmette, IL (US); Fengfei Xiao, Northbrook, IL (US); Xiaomang Wang, Lake Bluff, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 09/578,702

(22) Filed: May 26, 2000

(51) Int. Cl.[7] ................................................ C09D 11/02
(52) U.S. Cl. .................. 106/31.57; 106/31.58; 106/31.4; 106/31.37; 106/31.85; 106/31.86; 106/31.69; 106/31.72; 106/31.89
(58) Field of Search .................... 106/31.57, 31.58, 106/31.4, 31.37, 31.59, 31.85, 31.86, 31.69, 31.72, 31.89

(56) References Cited

U.S. PATENT DOCUMENTS

| | | | |
|---|---|---|---|
| 3,060,429 A | 10/1962 | Winston ....................... 346/11 |
| 3,298,030 A | 1/1967 | Lewis et al. .................. 347/74 |
| 3,373,437 A | 3/1968 | Sweet et al. .................. 347/73 |
| 3,416,153 A | 12/1968 | Hertz et al. ................... 347/73 |
| 3,673,601 A | 6/1972 | Hertz .......................... 347/73 |
| 3,846,141 A | 11/1974 | Ostergren et al. ......... 106/31.43 |
| 4,153,467 A | 5/1979 | Yano et al. |
| 4,228,442 A | 10/1980 | Krull |
| 4,352,901 A * | 10/1982 | Maxwell et al. .............. 524/38 |
| 4,389,503 A | 6/1983 | Maxwell et al. |
| 4,734,706 A | 3/1988 | Le et al. |
| 4,892,775 A * | 1/1990 | Song .......................... 428/195 |
| 4,936,916 A | 6/1990 | Shinmitsu et al. |
| 5,010,125 A * | 4/1991 | Kruse et al. ................. 524/308 |
| 5,270,368 A * | 12/1993 | Lent et al. ................... 524/236 |
| 5,443,628 A | 8/1995 | Loria et al. |
| 5,594,044 A | 1/1997 | Yang ........................... 523/160 |
| 5,711,791 A | 1/1998 | Croker et al. ............. 106/31.35 |
| 5,739,829 A | 4/1998 | Loyd ............................ 347/17 |
| 5,744,519 A | 4/1998 | Heraud et al. |
| 5,746,815 A | 5/1998 | Caputo |
| 5,755,860 A * | 5/1998 | Zhu ......................... 106/31.15 |
| 5,443,628 A | 6/1998 | Loria et al. |
| 5,781,214 A | 7/1998 | Vonasek et al. |

(List continued on next page.)

FOREIGN PATENT DOCUMENTS

| | | |
|---|---|---|
| EP | 0 408 333 | 1/1991 |
| GB | 1 603 062 | 11/1981 |
| WO | WO 98/13430 | 4/1998 |
| WO | WO 99/06213 | 2/1999 |
| WO | WO 99/20699 | 4/1999 |
| WO | WO 00/27935 | 5/2000 |

OTHER PUBLICATIONS

M. R. Keeling, "Ink Jet Printing", Phys. Technol., 12(5), 196–203 (1981), no month available.
Kuhn et al., "Ink Jet Printing", Scientific American, Apr. 1979, 162–178, no date available.
U.S. patent application Ser. No. 09/329,232, Zou et al., filed Jun. 10, 1999.

(List continued on next page.)

Primary Examiner—Mark L. Bell
Assistant Examiner—Veronica F. Faison
(74) Attorney, Agent, or Firm—Leydig, Voit & Mayer, Ltd.

(57) ABSTRACT

The present invention provides an ink jet ink composition suitable for use in continuous ink jet printing comprising a liquid vehicle, a binder resin, a colorant, and optionally a surfactant. The liquid vehicle includes an organic solvent or blend of solvents having an evaporation rate less than about 1.2, relative to n-butyl acetate standard which has an evaporation rate of 1.0. The present invention further provides a method for eliminating or reducing make-up consumption in continuous ink jet printing. The present invention further provides a process of continuous ink jet printing which is free or substantially free of make-up consumption.

52 Claims, 1 Drawing Sheet

U.S. PATENT DOCUMENTS

| | | | | |
|---|---|---|---|---|
| 5,980,624 A | | 11/1999 | Ichikawa | 106/31.58 |
| 6,010,564 A | * | 1/2000 | Zhu et al. | 106/31.37 |
| 6,087,416 A | * | 7/2000 | Pearlstine et al. | 106/31.6 |
| 6,113,679 A | | 9/2000 | Adkins et al. | |
| 6,117,225 A | | 9/2000 | Nicolls | |
| 6,140,391 A | | 10/2000 | Zou et al. | |
| 6,221,933 B1 | | 4/2001 | Zhu et al. | |
| 6,251,175 B1 | | 6/2001 | Zhu et al. | |

OTHER PUBLICATIONS

Wacker–Chemie GmbH; "Pioloform® B–Polyvinylbutyrale", Aug. 1995, (7 Pgs).

Union Carbide; "Glycolethers", 1989, pp. 1–6., no month available.

Union Carbide; "PropylPROPASOL® Solvent", 1987, pp. 1–10, no month available.

Orient Chemical Industries Ltd.; "Nigrosine Group Dyes", pp. 1–8, no month available.

Wacker–Chemie GmbH; "Pioloform® BN 18", Aug. 1997, pp. 1–3.

Chemical Manufacturers Association Solvents Council; "Using VOC–Exempt Solvents to Formulate Compliant Coatings", pp. 1–7, no date available.

Exxon Corporation; "TELURA® Industrial Process Oils", Aug. 25, 1988, pp. 1–5.

BYK–Chemie USA; "Silicone Surface Additives", Data Sheet S2, Mar., 1996, pp. 1–4.

Wacker–Chemie GmbH; "Pioloform® BL 16", Aug. 1997, pp. 1–3.

Monsanto; "Butvar® Polyvinyl Butyral Resin", pp. 1–9, no date available.

Lawter International, Inc.; "Krumbhaar–1717 Series Polyketone/aldehyde resins", pp. 1–7, no date available.

CBA–Geigy, "Orasol Solvent Soluble Dyes", 11 pages, no date available.

Dow Chemical Co., "The Glycol Ethers Handbook", Oct. 1993, 3 pages.

Dow Chemical Co., "DOWANOL TPM Glycol Ether"; http://www.dow.com/dowanol/nam/products/tpm.htm, © 1995–2001.

Videojet, "InkSource News", Issue No. I–35, Jun., 1995.

Dow Chemical Co., "DOWANOL DPM Glycol Ether"; http://www.dow.com/dowanol/nam/products/dpm.htm, © 1995–2001.

Dow Chemical Co., "DOWANOL EB Glycol Ether"; http://www.dow.com/dowanol/nam/products/eb.htm, © 1995–2001.

Dow Chemical Co., "DOWANOL DB Glycol Ether"; http://www.dow.com/dowanol/nam/products/db.htm, © 1995–2001.

Siddiqui, U.S. application No. 08/787,405 (Copy of Application and Allowed Claims).

Zhu et al., U.S. application No. 09/579,519 (Pending Claims).

* cited by examiner

CONTINUOUS INK JET PRINTING INK COMPOSITION

TECHNICAL FIELD OF THE INVENTION

The present invention generally relates to continuous ink jet printing and ink compositions suitable therefor, and particularly to continuous ink jet printing and ink compositions that allow continuous printing with reduced or no make-up of the ink composition.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed image on that surface.

Reviews of various aspects of ink jet printing can be found in Kuhn et al, *Scientific American*, Apr. 1979, 162–178; and Keeling, *Phys. Technol.*, 12(5), 196–203 (1981). Various ink jet apparatuses are described in U.S. Pat. Nos. 3,060,429; 3,298,030; 3,373,437; 3,416,153; and 3,673,601. An example of a continuous inkjet ink composition can be found in U.S. Pat. No. 5,594,044. In general, an ink composition for use in continuous ink jet printing should possess certain desirable properties relating to viscosity, electrical resistivity, and ink dry time on the substrate. For example, a short dry time is preferable as it allows high printing speeds.

In single nozzle type continuous ink jet printing, the ink jet emanating from the nozzle breaks into small droplets. A stimulation signal is typically applied to the nozzle to form uniformly spaced ink droplets. During printing, the printing ink droplets are charged and are deflected as they pass through a region of high voltage of opposite charge. The deflected droplets are deposited onto a substrate at a location that is determined by the charging levels. The non-printing droplets are collected and returned to the ink module or tank. Generally a vacuum present in the ink tank facilitates the return of ink. In binary array type continuous ink jet printing, the printing drops are not charged and are deposited onto a substrate. The non-printing droplets are charged and deflected to a gutter and returned to the ink module or tank. The ink is thus recycled. During recycling, the ink is exposed to the ambient atmosphere and/or the vacuum, and the volatile component of the ink evaporates. The evaporation of the solvent leads to an increase in ink viscosity. The increase in ink viscosity leads to a decrease in ink flow rate. This ultimately leads to deterioration in print quality or the ability to operate the printer without interruption.

The loss of solvents in continuous ink jet printing has been recognized in the industry; see, e.g., U.S. Pat. No. 3,846,141. To maintain sufficient fluidity of the ink a make-up fluid is added to the return tank to replace lost fluids; see, e.g., U.S. Pat. No. 5,711,791.

A disadvantage of this approach includes the cost associated with the incorporation of complex mechanical and electronic ink controls into the printing system. In addition, the cost of the make-up fluid can be significantly high, as make-up consumption rates of, e.g., as high as 200 g/24 hours and higher have been experienced in continuous ink jet printing. Further, the evaporation of certain volatile solvents into the atmosphere may require ventilation considerations that at times are not desirable to the customer.

U.S. Pat. No. 5,980,624 attempts to solve the problem of solvent loss from inks employed mainly in stamp pads and ball point pens. Inks employed in these applications are distinct from continuous ink jet inks. Continuous ink jet inks have properties, e.g., viscosity, and requirements, that are distinct or more stringent than those of stamp pad or ball point inks. In as much as the '624 patent mentions ink jet ink, it does not mention or address the concerns relating to continuous ink jet inks.

Thus, there exists a need for a continuous ink jet ink composition that has a reduced evaporation rate. There further exists a need for an ink composition that allows operation of the continuous ink jet printer with reduced or no make-up and that provides short dry time of the ink on the substrate. There further exists a need for a continuous ink jet printing process wherein ink make-up is reduced or eliminated.

The advantages of the present invention will be apparent from the detailed description of the preferred embodiments of the invention set forth below.

BRIEF SUMMARY OF THE INVENTION

Many of the foregoing needs have been fulfilled by the present invention which provides an ink jet ink composition suitable for use in continuous ink jet printing. In an embodiment, the ink composition comprises a liquid vehicle, one or more binder resins, and one or more colorants. Preferably the ink composition contains a surfactant. The present invention further provides a method for eliminating or reducing make-up in continuous ink jet printing. An important aspect of the ink composition of the present invention is that make-up consumption is reduced or eliminated without significantly increasing ink dry time on a substrate. The present invention further provides a process of continuous ink jet printing which is free or substantially free of make-up.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF EMBODIMENTS

Figure 1:
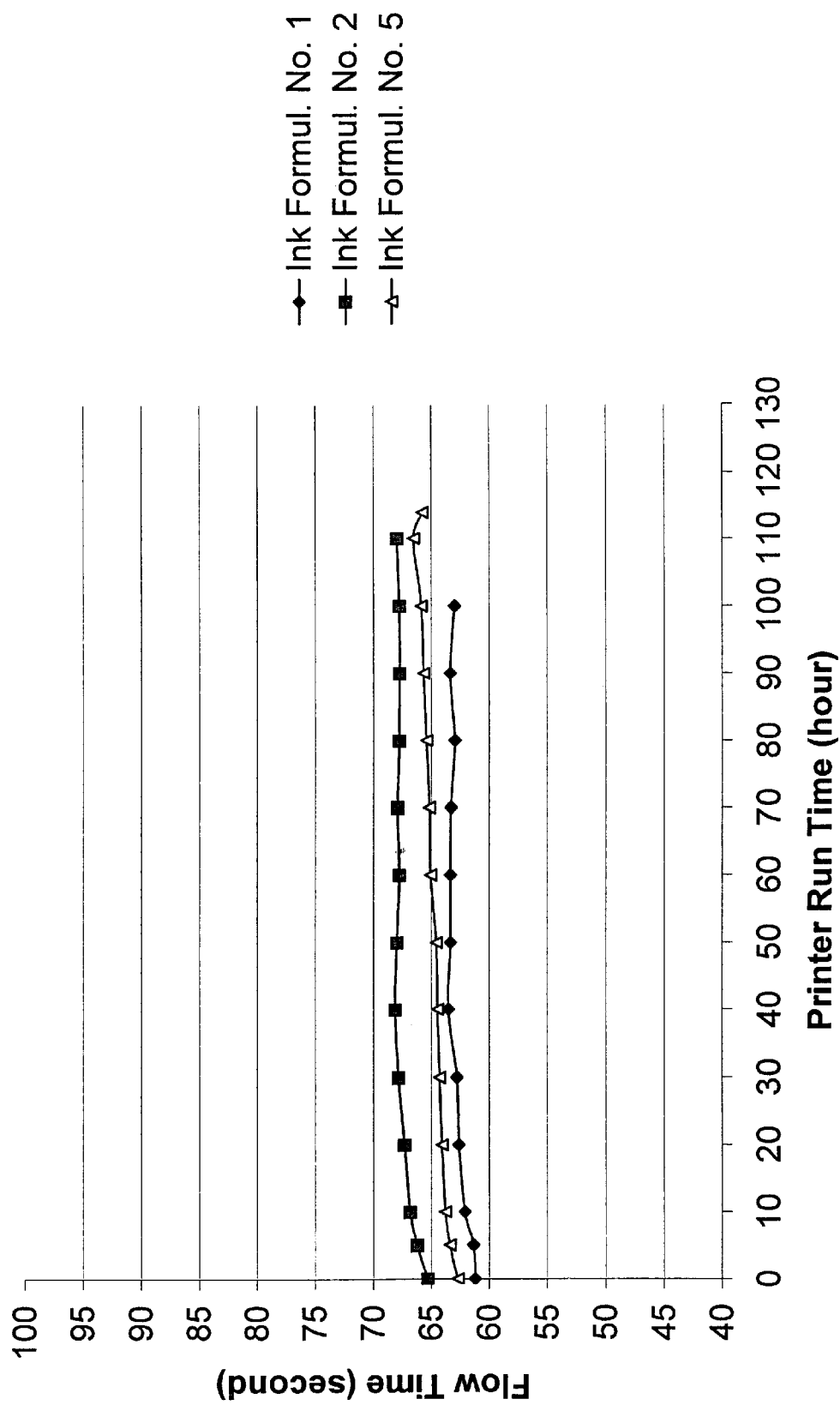
FIG. 1 depicts the flow time of embodiments of the continuous ink jet ink composition described in Example 2 as a function of printer run time. The x-axis depicts the printer run time in hours and the y-axis depicts the flow time of the ink in seconds. The printing rate was set at 7.2 $cm^3$/hour, which was equivalent to 2.4% of the jetted ink being printed on the substrate.

The present invention provides a jet ink composition suitable for use in continuous ink jet printing. The jet ink composition has the advantage that it reduces, and in a preferred embodiment, eliminates ink make-up. Reduction or elimination of the make-up benefits the overall system cost, both to the end user and the manufacturer. Other advantages include lower maintenance, lower solvent storage, and/or reduced solvent emission.

The present invention provides a jet ink composition comprising a liquid vehicle, one or more binder resins, a colorant. The ink composition preferably includes a surfactant. The jet ink composition is suitable for use in continuous ink jet printing.

In embodiments of the invention, the jet ink composition has (1) a viscosity of from about 1.6 to about 10.0 centipoises (cP) at 25° C.; (2) a specific electrical resistivity of from about 50 to about 2000 ohm-cm; and (3) a sonic velocity of from about 1100 to about 1700 meters/second. The ink composition is fast drying on substrates, e.g., embodiments of the ink composition have a dry time on substrates of less than about 10 seconds.

The jet ink composition of the present invention can include as liquid vehicle any suitable solvent. Organic solvents are preferred. Examples of suitable organic solvents include ketones, ethers, esters, amides, alcohols, alkoxyalcohols, or a combination thereof. Water can be used in combination with organic solvents.

The liquid vehicle includes a relatively low evaporating solvent. In embodiments of the invention, the liquid vehicle of the ink composition includes at least about 30% or more, preferably 50% or more, and more preferably about 60% or more, of a solvent or a solvent blend that has an evaporation rate of up to about 1.5 (±0.2) relative to n-butyl acetate standard which has an evaporation rate of 1.0, as determined by the ASTM Method D-3539. In certain embodiments, the solvent or solvent blend has an evaporation rate of about 1.2 or less, e.g., from about 0.1 to about 1.2, preferably from about 0.1 to about 1.0, and more preferably from about 0.2 to about 0.7. Particular examples of organic solvents include 1-methoxy-2-propanol (PM) and acetone alcohol. PM has an evaporation of about 0.7. Acetone alcohol has an evaporation rate of about 0.1.

The liquid vehicle can be present in any suitable amount, typically up to 98% by weight, preferably from about 30% to about 90%, and more preferably from about 50% to about 90% by weight of the ink composition.

Solvents such as N-methyl pyrrolidone (NMP) and methyl lactate (ML), which have relatively evaporation rates near the lower end, such as e.g., less than 0.1, of the evaporation rate scale above, are preferably used in combination with solvents such as PM and acetone alcohol. The lower evaporating solvents such as NMP and ML are preferably used in smaller amounts, for example, in an amount typically less than about 20% by weight, preferably less than 10% by weight, and more preferably from about 2% by weight to about 8% by weight of the ink composition. Water is typically used in a small amount, typically less than about 5%.

The jet ink composition includes one or more binder resins. The binder resin imparts adhesion to the substrate. The binder resin preferably has good solvent release properties. Examples of binder resins include ketone resins, aldehyde resins, cellulose derivative resins, acrylic resins, phenolic resins, rosin resins, modified rosin resins such as phenolic modified rosin resins, and vinyl resins. Examples of suitable resins include KRUMBHAAR™ K-1717HMP, a polyketone resin, and KRUMBHAAR™ K-3107, a phenolic modified rosin resin, both resins available from Lawter International, Inc. in Northbrook, Ill. An example of an aldehyde resin is a polyvinyl butyral resin, e.g., PIOLOFORM™ LL4150 resin available from Wacker Chemie, Adrian, Mich. An example of cellulosic resin is nitrocellulose resin, e.g., the nitrocellulose 18/25 cP grade available from Hercules, Inc. in Wilmington, Del.

The jet ink composition includes a colorant. Any suitable colorant, e.g., a pigment, dye, or lake, can be used. Preferably, the ink composition includes a dye. An example of a suitable dye is C.I. Solvent Black 29 available as ORASOL BLACK RLI™ from Ciba Corp. in Newport, Del. C.I. Solvent Black 29 is also available from Orient Chemical, Inc., in Japan. For other examples of dyes, see U.S. Pat. No. 5,594,044.

The jet ink composition includes the colorant in an amount to produce a suitable contrast and/or readability. The colorant is typically present in an amount less than 10% by weight, e.g., from about 0.5% to about 10% by weight, preferably from about 1% to about 5% by weight of the jet ink composition.

The ink composition preferably includes a surfactant. Any suitable surfactant can be employed, e.g., a silicon compound, a fluorocarbon compound, or an alkylphenoxy compound. Typical surfactants include siloxanes, fluorocarbon esters or fluorinated esters, and alkylphenoxy alkyleneoxides. Mixtures of surfactants also can be employed.

An example of a siloxane is poly(alkyleneoxide) modified siloxane or a polyester modified siloxane such as poly(alkyleneoxide) modified polydimethylsiloxane or a polyester modified polydimethylsiloxane. An example of a poly(alkyleneoxide) modification is poly(ethyleneoxide) modification. For example, SILWET™ 7622, a poly(alkyleneoxide) modified polydimethylsiloxane from Witco can be employed, or BYK™ 333, a polyester modified polydimethylsiloxane from BYK-Chemie USA can be employed. The alkylphenoxy compound preferably includes an alkylphenoxy poly(alkyleneoxy) moiety. An example of an alkylphenoxy compound nonylphenoxy poly(ethyleneoxy)ethanol such as the nonylphenoxy poly(ethyleneoxy)ethanol available as IGEPAL™ CO-210 or IGEPAL CO-430 from Rhodia Inc. In embodiments, ethoxylated nonylphenols are preferred surfactants. An example of a fluorocarbon ester is a fluoroaliphatic polymeric ester such as FC™-430 available from 3M Co.

The surfactant can be present in any suitable amount, preferably in an amount up to about 5% by weight or more, more preferably in an amount of up to 2% by weight, and even more preferably in an amount of greater than or about 0.05% to about 1% by weight of the ink composition.

The surfactant molecules have a tendency to stay at the liquid/air interface due to the surfactant's low surface tension. It is believed that the surfactant molecules act as a boundary or barrier. The surfactant retards or eliminates solvent evaporation. The surfactant preferably moves rapidly to the surface of ink droplets. As the droplets are generated and flung in the air, the surface gets disrupted; the disrupted surface is healed as the surfactant moves to the air liquid interface. Further, as the ink returns to the ink reservoir, the surface tends to get disrupted. The surfactant moves to the air liquid interface and heals the disruption. Accordingly, the diffusion rate of the surfactant in the ink should be preferably high. Relatively small molecular size of the surfactant favors rapid diffusion. High bulk concentration of the surfactant provides increased concentration at the air liquid interface. The thickness of the boundary layer favors reduction in evaporation. In embodiments of the invention, higher molecular weight surfactants provide thicker boundary layers and are more effective in reducing solvent evaporation.

The jet ink composition may include one or more additional ingredients, e.g., a plasticizer. A preferred plasticizer is Plasticizer 160, which is butyl benzyl o-phthalate and available from Monsanto Co. The plasticizer can be present in any suitable amount. For example, the plasticizer can be present in an amount of up to about 5% by weight of the jet ink composition, preferably in an amount of from about 1% by weight to about 5% by weight, and more preferably in an amount of about 3% by weight of the jet ink composition.

The jet ink composition may contain one or more additives that improve or contribute to performance, e.g., conductivity agents. They usually are present in an amount of up to about 5.0% by weight of the jet ink composition. Examples of suitable conductivity agents include lithium salts such as lithium trifluoromethanesulfonate, available as FC™-122 from 3M Co., and lithium nitrate, dimethylamine hydrochloride, diethylamine hydrochloride, and hydroxylamine hydrochloride.

The jet ink composition may include an adhesion promoter. The adhesion promoter increases adhesion and/or improves rub resistance of the printed image. An example of a suitable adhesion promoter is a silane such as Silane A-187 available from Union Carbide Co. Adhesion promoters can be used in any suitable amount, e.g., in an amount up to about 2% or more by weight of the ink composition.

The jet ink composition may include a defoamer. The defoamer reduces the foaming tendency of the ink composition. An example of a suitable defoamer is BYK™ 065 from BYK-Chemie USA. The defoamer can be used in an amount of, e.g., up to about 1% by weight of the ink composition.

The present invention further provides a process for continuous ink jet printing on an object comprising projecting a stream of droplets of the ink composition to the object and controlling the direction of the stream so that the droplets are caused to form the desired printed image on the object. The process is free or substantially free of ink make-up consumption and the ink composition includes a liquid vehicle containing at least about 30% or more by weight of a solvent or a solvent blend having an evaporation rate of about 1.5 or less, preferably about 1.2 or less, relative to n-butyl acetate standard which has an evaporation rate of 1.0, one or more binder resins, and a colorant. Preferably, the ink composition includes a surfactant, wherein the surfactant is present in an amount up to about 2%.

Make-up consumption can be reduced in accordance with the present invention, by a careful choice of solvents and/or the use of a surfactant. Thus, in certain embodiments of the process, make-up consumption can be reduced by an amount of about 20% or more, and preferably 40% or more. In further preferred embodiments, make-up consumption can be reduced by about 80% or more relative to compositions.

In even more preferred embodiments, make-up consumption can be fully eliminated.

The make-up consumption rate of an ink composition can be determined by methods known to those skilled in the art, e.g., by measuring the viscosity or the flow time of the ink. The flow time of the ink through a cylindrical pipe of fixed length can be measured and compared to its set point. In embodiments of the present invention, the ink composition shows an increase in flow time of less than 15%, preferably less than 10%, and more preferably from about 2% to about 8%, over a period of 120 hours.

The jet ink composition of the present invention is suitable for printing on a variety of substrates including paper, e.g., coated paper, glass, aluminum, e.g., aluminum foil, and plastics, e.g., polyethylene, PVC, acrylonitrile butadiene styrene polymers, and polyvinylidene fluoride.

The following Examples further illustrate embodiments of the present invention, but of course, should not be construed in any way as limiting the scope of the present invention.

EXAMPLE 1

This Example illustrates the preparation and properties of embodiments of the ink composition of the present invention. The following ingredients were combined and mixed for 90 minutes. The resulting solution was filtered to obtain the ink composition, Ink Formulation No. 1:

| Material | Weight % |
| --- | --- |
| 1-Methoxy-2-propanol | 78.0 |
| Deionized water | 2.0 |
| Methyl lactate | 5.0 |
| Polyalkyleneoxide modified polydimethylsiloxane (SILWET-7622) | 2.0 |
| Polyketone resin, KRUMBHAAR K-1717HMP | 6.0 |
| Phenolic modified rosin resin, KRUMBHAAR K-3107 | 0.5 |
| Solvent Black 29 | 4.5 |
| FLUORAD ™ brand lithium trifluoromethanesulfonate (FC-122) | 2.0 |
| Total | 100.0 |

The ink composition had the following properties:

| | |
| --- | --- |
| Viscosity | 4.3 cP |
| Resistivity | 1323 ohm-cm |
| pH | 3.8 |
| Specific gravity | 0.98 g/cm$^3$ |
| Velocity of sound | 1320 meter/second. |

Ink Formulation Nos. 2–6 were prepared and the ingredients are set forth below:

Ink Formulation No. 2

| Material | Weight % |
| --- | --- |
| 1-Methoxy-2-propanol | 83.0 |
| Lithium trifluoromethanesulfonate (FC-122) | 2.0 |
| D.I. Water | 2.0 |
| Polyketone resin KRUMBHAAR K-1717HMP | 6.0 |
| Phenolic modified rosin resin, KRUMBHAAR K-3107 | 0.5 |
| Solvent Black 29 | 4.5 |
| Polyester modified polydimethylsiloxane, (SILWET 1-7622) | 2.0 |
| Total | 100.0 |

Ink Formulation No. 3

| Material | Weight % |
| --- | --- |
| 1-Methoxy-2-propanol | 79.9 |
| Methyl lactate | 5.0 |
| Potassium thiocyanate | 1.5 |
| Polyvinyl butyral, PIOLOFORM LL 4150 | 0.6 |
| Polyketone resin, KRUMBHAAR K- 1717HMP | 5.0 |
| Solvent black 29 | 5.0 |
| Fluoroaliphatic polymeric ester (FC-430) (10% in MEK) | 3.0 |
| Total | 100.0 |

Ink Formula No. 4

| Material | Weight % |
| --- | --- |
| N-Methyl pyrrolidone | 7.0 |
| 1-Methoxy-2-propanol | 78.4 |
| Deionized water | 1.0 |
| Polyketone resin, KRUMBHAAR K-1717HMP | 4.0 |
| Nitrocellulose 18/25 cps | 0.8 |
| Solvent Black 29 | 4.5 |
| Butyl benzyl phthalate | 0.5 |
| Nonylphenoxy poly(ethyleneoxy)-ethanol (IGEPAL CO-210) | 2.0 |
| Lithium nitrate | 1.8 |
| Total | 100.0 |

Ink Formulation No. 5

| Material | Weight % |
| --- | --- |
| 1-Methoxy-2-propanol | 85.0 |
| Lithium trifluoromethanesulfonate (FC-122) | 2.0 |
| D.I. Water | 2.0 |
| KRUMBHAAR K-1717HMP | 6.0 |
| KRUMBHAAR K-3107 | 0.5 |
| Solvent Black 29 | 4.5 |
| Total | 100.0 |

Ink Formulation No. 6

| Material | Weight % |
| --- | --- |
| 1-Methoxy-2-propanol | 76.95 |
| D.I. Water | 2.0 |
| Methyl lactate | 8.0 |
| Polyester modified polydimethylsiloxane (BYK 333) | 0.1 |
| KRUMBHAAR K-1717HMP | 6.0 |
| KRUMBHAAR K-3107 | 0.75 |
| Solvent Black 29 | 4.5 |
| Lithium Nitrate | 1.7 |
| Total | 100.0 |

EXAMPLE 2

This Example illustrates an advantage of an embodiment of the ink composition of the present invention. The ink composition was suitable for continuous ink jet printing without make-up.

Ink Formulation Nos. 1, 2, and 5 described in Example 1 were loaded in separate runs into a Marconi Data Systems EXCEL™ Videojet 170i printer. The printer was run at a printing rate of 7.2 cm³/hour. This printing rate was equivalent to 2.4% of the ink jetted being printed on the substrate and the rest being recycled.

The flow time of the ink was measured as a function of printer run time. The results obtained are set forth in FIG. 1. The flow time of the jet ink of the present invention was relatively constant over the duration of the test period. The flow time reached a dynamic equilibrium value and maintained at that value. After reaching equilibrium, ink Formulas 1, 2, and 5 showed flow time increases of 1.9%, 2.5%, and 3.7% respectively, compared with the set point. The prints of these ink formulations showed dry time of less then 10 seconds.

EXAMPLE 3

This Example illustrates ink compositions wherein the use of a surfactant reduced make-up consumption rate. Ink Formulation Nos. 7–8 were prepared from the following ingredients:

Ink Formulation No. 7

| Material | Weight % |
| --- | --- |
| Methyl ethyl ketone | 79.5 |
| 1-Methoxy-2-propanol | 3.0 |
| PIOLOFORM LL 4150 | 7.5 |
| Solvent Black 29 | 5.0 |
| SILWET L-7622 | 5.0 |
| Total | 100.0 |

Ink Formulation No. 8

| Material | Weight % |
| --- | --- |
| 1-Methoxy-2-propanol | 83.0 |
| D.I. Water | 2.0 |
| Lithium trifluoromethanesulfonate | 2.0 |
| Polyketone resin, KRUMBHAAR K-1717HMP | 6.0 |
| Polyketone resin, KRUMBHAAR K-3107 | 0.5 |
| Solvent Black 29, VALIFAST BLACK 3808 | 4.5 |
| SILWET L-7622 | 2.0 |
| Total | 100.0 |

The ink formulations were tested for drying time and make-up consumption. The results obtained are set forth below:

| Ink Formulation No. | Dry Time (Seconds) | Make-up Consumption (g/24 hours) |
| --- | --- | --- |
| 7 | 2.5 | 140 |
| 8 | 5 | 12 |

The foregoing shows that make-up consumption can be reduced by reducing the volatility of the solvent. Advantageously, one or more surfactants can be included in the ink composition to reduce or eliminate make-up consumption.

All of the references, including patents and publications, cited herein are incorporated in their entireties by reference.

While this invention has been described with emphasis upon a preferred embodiment, it will be obvious to those of ordinary skill in the art that the preferred composition may be varied. It is intended that the invention may be practiced otherwise than as specifically described herein. Accordingly, this invention includes all modifications encompassed within the spirit and scope of the following claims.

What is claimed is:

1. A method for reducing or eliminating ink make-up in continuous ink jet printing comprising providing a jet ink composition which is suitable for use in continuous ink jet printing comprising a liquid vehicle, one or more binder resins, and a colorant, wherein the liquid vehicle comprises at least about 30% by weight of 1-methoxy-2-propanol, the ink composition is free of oil, and the binder resin is selected from the group consisting of a polyketone resin, a polyvinyl butyral resin, a cellulose derivative resin, an acrylic resin, a phenolic resin, a modified rosin, and a combination thereof.

2. The method of claim 1, wherein the jet ink composition has (1) a viscosity of 1.6 to about 10.0 cP at 25° C.; (2) a specific electrical resistivity of about 50 to about 2000 ohm-cm; and (3) a sonic velocity of from about 1100 to about 1700 meters/second.

3. The method of claim 1, wherein the colorant comprises a dye.

4. The method of claim 1, wherein the cellulose derivative resin is nitrocellulose.

5. The method of claim 1, wherein the liquid vehicle comprises about 60% or more by weight of 1-methoxy-2-propanol.

6. The method of claim 1, wherein the liquid vehicle comprises about 60% to about 88.5% by weight of 1-methoxy-2-propanol.

7. The method of claim 1, wherein the liquid vehicle comprises about 88.5% to about 97.7% by weight of 1-methoxy-2-propanol.

8. The method of claim 1, wherein the liquid vehicle further comprises a glycol ether, a ketone, an ester, an alcohol, an ether, or a combination thereof.

9. A process for continuous ink jet printing on an object comprising projecting a stream of droplets of an ink composition to the object and controlling the direction of the stream so that the droplets are caused to form the desired printed image on the object, wherein the process comprises reduced or no ink make-up and the ink composition comprises a liquid vehicle, one or more binder resins, and a colorant, wherein the liquid vehicle comprises at least about 30% by weight of 1-methoxy-2-propanol, the ink composition is free of oil and contains less than 5% by weight of water, and the binder resin is selected from the group consisting of a polyketone resin, a polyvinyl butyral resin, a cellulose derivative resin, an acrylic resin, a phenolic resin, a modified rosin, and a combination thereof.

10. A jet ink composition comprising a liquid vehicle, one or more binder resins, and a colorant, wherein the liquid vehicle comprises about 60% or more by weight of 1-methoxy-2-propanol, the ink composition is suitable for use in continuous ink jet printing with reduced or no ink make-up, is free of oil, and contains less than 5% by weight of water, and the binder resin is selected from the group consisting of a polyketone resin, a polyvinyl butyral resin, a cellulose derivative resin, an acrylic resin, a modified rosin, and a combination thereof.

11. The jet ink composition of claim 10, which has (1) a viscosity of 1.6 to about 10.0 cP at 25° C.; (2) a specific electrical resistivity of about 50 to about 2000 ohm-cm; and (3) a sonic velocity of from about 1100 to about 1700 meters/second.

12. A method for reducing ink make-up in continuous ink jet printing comprising providing a jet ink composition which is suitable for use in continuous ink jet printing comprising a liquid vehicle, one or more binder resins, a colorant, and a surfactant, wherein the liquid vehicle comprises at least about 30% by weight of a glycol ether having a relative evaporation rate of from about 0.1 to about 1.5, the surfactant is present in an amount of from 0.3% to about 5% by weight of the ink composition, the ink composition is free of oil and contains less than 5% by weight of water, and the binder resin is selected from the group consisting of a polyketone resin, a polyvinyl butyral resin, a cellulose derivative resin, an acrylic resin, a phenolic resin, a modified rosin, and a combination thereof.

13. The method of claim 12, wherein the glycol ether is 1-methoxy-2-propanol.

14. The method of claim 12, wherein the colorant comprises a dye.

15. A method for reducing ink make-up in continuous ink jet printing comprising providing a jet ink composition which is suitable for use in continuous ink jet printing comprising a liquid vehicle, one or more binder resins selected from the group consisting of a polyketone resin, a polyvinyl butyral resin, nitrocellulose, an acrylic resin, a phenolic resin, a modified rosin, and a combination thereof, a colorant, and a surfactant, wherein the liquid vehicle comprises at least about 30% by weight of one or more organic solvents having a relative evaporation rate of from about 0.1 to about 1.5, the surfactant is present in an amount of from 0.3% to about 5% by weight of the ink composition, and the ink composition is free of oil and contains less than 5% by weight of water.

16. The method of claim 15, wherein the surfactant comprises a silicon compound, a fluorocarbon compound, an alkylphenoxy compound, or a combination thereof.

17. The method according to claim 15, wherein the liquid vehicle comprises about 60% or more by weight of the one or more organic solvents.

18. The method according to claim 15, wherein the liquid vehicle comprises about 60% to about 88.5% by weight of the one or more organic solvents.

19. The method according to claim 15, wherein the liquid vehicle comprises about 97.6% to about 98.8% by weight of the one or more organic solvents.

20. The method according to claim 15, wherein the liquid vehicle comprises about 98.8% to 100% by weight of the one or more organic solvents.

21. The method according to claim 15, wherein the one or more organic solvents have a relative evaporation rate of from about 0.1 to about 1.2.

22. The method according to claim 15, wherein the one or more organic solvents have a relative evaporation rate of from about 0.1 to about 1.0.

23. The method according to claim 15, wherein the one or more solvents have a relative evaporation rate of from about 0.2 to about 0.7.

24. The method according to claim 15, wherein the surfactant is present in an amount of from 0.3% to about 2% by weight.

25. The method according to claim 15, wherein the surfactant is present in an amount of from 0.3% to about 1% by weight.

26. The method of claim 15, wherein the organic solvent comprises a glycol ether, a ketone, an ester, an alcohol, an ether, or a combination thereof.

27. The method of claim 26, wherein the ketone is methyl ethyl ketone.

28. The method of claim 15, wherein the liquid vehicle comprises methyl ethyl ketone and 1-methoxy-2-propanol.

29. A method for reducing ink make-up in continuous ink jet printing comprising providing a jet ink composition which is suitable for use in continuous ink jet printing comprising a liquid vehicle, one or more binder resins, a colorant, and a surfactant, wherein the liquid vehicle comprises at least about 30% by weight of one or more organic solvents having a relative evaporation rate of from about 0.1 to about 1.5, the surfactant is present in an amount of from 0.3% to about 5% by weight of the ink composition, and the ink composition is free of oil and contains less than 5% by weight of water, and the surfactant is nonylphenoxy poly (ethyleneoxy)ethanol.

30. The method of claim 29, wherein the organic solvent comprises a glycol ether, a ketone, an ester, an alcohol, an ether, or a combination thereof.

31. The method of claim 30, wherein the ketone is methyl ethyl ketone.

32. The method of claim 29, wherein the liquid vehicle comprises methyl ethyl ketone and 1-methoxy-2-propanol.

33. The method according to claim 29, wherein the liquid vehicle comprises about 60% or more by weight of the one or more organic solvents.

34. The method according to claim 29, wherein the liquid vehicle comprises about 60% to about 88.5% by weight of the one or more organic solvents.

35. The method according to claim 29, wherein the liquid vehicle comprises about 97.6% to about 98.8% by weight of the one or more organic solvents.

36. The method according to claim 29, wherein the liquid vehicle comprises about 98.8% to 100% by weight of the one or more organic solvents.

37. The method according to claim 29, wherein the one or more organic solvents have a relative evaporation rate of from about 0.1 to about 1.2.

38. The method according to claim 29, wherein the one or more organic solvents have a relative evaporation rate of from about 0.1 to about 1.0.

39. The method according to claim 29, wherein the one or more solvents have a relative evaporation rate of from about 0.2 to about 0.7.

40. The method according to claim 29, wherein the surfactant is present in an amount of from 0.3% to about 2% by weight.

41. The method according to claim 29, wherein the surfactant is present in an amount of from 0.3% to about 1% by weight.

42. A process for continuous ink jet printing on an object comprising projecting a stream of droplets of the ink composition comprising a liquid vehicle, one or more binder resins, and a colorant, wherein the liquid vehicle comprises about 60% or more by weight of 1-methoxy-2-propanol, the ink composition is suitable for use in continuous ink jet printing with reduced or no ink make-up, is free of oil, and contains less than 5% by weight of water, and the binder resin is selected from the group consisting of a polyketone resin, a polyvinyl butyral resin, a cellulose derivative resin, an acrylic resin, a modified rosin, and a combination thereof to the object and controlling the direction of the stream so that the droplets are caused to form the desired printed image on the object.

43. A jet ink composition comprising a liquid vehicle, one or more binder resins, a surfactant, and a colorant, wherein the liquid vehicle comprises about 60% or more by weight of 1-methoxy-2-propanol, the ink composition is suitable for use in continuous ink jet printing with reduced or no ink make-up, is free of oil, and contains less than 5% by weight of water, and the surfactant is nonylphenoxy poly (ethyleneoxy)ethanol.

44. A jet ink composition comprising a liquid vehicle, one or more binder resins, and a colorant, wherein the liquid vehicle comprises methyl ethyl ketone and about 60% or more by weight of 1-methoxy-2-propanol, and the ink composition is suitable for use in continuous ink jet printing with reduced or no ink make-up, is free of oil, and contains less than 5% by weight of water.

45. A jet ink composition comprising a liquid vehicle, one or more binder resins, and a colorant, wherein the liquid vehicle comprises about 60% or more by weight of 1-methoxy-2-propanol, the ink composition is suitable for use in continuous ink jet printing with reduced or no ink make-up, and is free of oil, and the binder resin is selected from the group consisting of a polyketone resin, a polyvinyl butyral resin, a cellulose derivative resin, an acrylic resin, a modified rosin, and a combination thereof.

46. A jet ink composition comprising a liquid vehicle, one or more binder resins, a surfactant, and a colorant, wherein the liquid vehicle comprises about 60% or more by weight of 1-methoxy-2-propanol, the ink composition is suitable for use in continuous ink jet printing with reduced or no ink make-up, and is free of oil, and the surfactant is nonylphenoxy poly(ethyleneoxy)ethanol.

47. A jet ink composition comprising a liquid vehicle, one or more binder resins, and a colorant, wherein the liquid vehicle comprises methyl ethyl ketone and about 60% or more by weight of 1-methoxy-2-propanol, and the ink composition is suitable for use in continuous ink jet printing with reduced or no ink make-up, and is free of oil.

48. A process for continuous ink jet printing on an object comprising projecting a stream of droplets of the ink composition comprising a liquid vehicle, one or more binder resins, a surfactant, and a colorant, wherein the liquid vehicle comprises about 60% or more by weight of 1-methoxy-2-propanol, the ink composition is suitable for use in continuous ink jet printing with reduced or no ink make-up, is free of oil, and contains less than 5% by weight of water, and the surfactant is nonylphenoxy poly (ethyleneoxy)ethanol to the object and controlling the direction of the stream so that the droplets are caused to form the desired printed image on the object.

49. A process for continuous ink jet printing on an object comprising projecting a stream of droplets of the ink composition comprising a liquid vehicle, one or more binder resins, and a colorant, wherein the liquid vehicle comprises methyl ethyl ketone and about 60% or more by weight of 1-methoxy-2-propanol, and the ink composition is suitable for use in continuous ink jet printing with reduced or no ink make-up, is free of oil, and contains less than 5% by weight of water to the object and controlling the direction of the stream so that the droplets are caused to form the desired printed image on the object.

50. A process for continuous inkjet printing on an object comprising projecting a stream of droplets of the ink composition comprising a liquid vehicle, one or more binder resins, and a colorant, wherein the liquid vehicle comprises about 60% or more by weight of 1-methoxy-2-propanol, the ink composition is suitable for use in continuous ink jet printing with reduced or no inkmake-up, and is free of oil, and the binder resin is selected from the group consisting of a polyketone resin, a polyvinyl butyral resin, a cellulose derivative resin, an acrylic resin, a modified rosin, and a combination thereof to the object and controlling the direction of the stream so that the droplets are caused to form the desired printed image on the object.

51. A process for continuous inkjet printing on an object comprising projecting a stream of droplets of the ink composition comprising a liquid vehicle, one or more binder resins, a surfactant, and a colorant, wherein the liquid vehicle comprises about 60% or more by weight of 1-methoxy-2-propanol, the ink composition is suitable for use in continuous ink jet printing with reduced or no ink make-up, and is free of oil, and the surfactant is nonylphenoxy poly(ethyleneoxy)ethanol to the object and controlling the direction of the stream so that the droplets are caused to form the desired printed image on the object.

52. A process for continuous ink jet printing on an object comprising projecting a stream of droplets of the ink composition comprising a liquid vehicle, one or more binder resins, and a colorant, wherein the liquid vehicle comprises methyl ethyl ketone and about 60% or more by weight of 1-methoxy-2-propanol, and the ink composition is suitable for use in continuous ink jet printing with reduced or no ink make-up, and is free of oil to the object and controlling the direction of the stream so that the droplets are caused to form the desired printed image on the object.

* * * * *